United States Patent [19]
Fontaine

[11] Patent Number: 5,876,055
[45] Date of Patent: Mar. 2, 1999

[54] AUTOMATIC TOLERANCE REDUCING GREASELESS FIFTH WHEEL USING A WEDGE AND JAW LOCKING SYSTEM THAT ELIMINATES SQUIRTING

[76] Inventor: John P. K. Fontaine, P.O. Box 100969, Birmingham, Ala. 35210

[21] Appl. No.: 34,955

[22] Filed: Mar. 4, 1998

[51] Int. Cl.$^6$ .................................................. B62D 53/10
[52] U.S. Cl. ............................................................ 280/437
[58] Field of Search .................................... 280/433, 434, 280/435, 436, 437

[56] References Cited

U.S. PATENT DOCUMENTS

| | | |
|---|---|---|
| 2,456,826 | 12/1948 | Fontaine . |
| 2,726,878 | 12/1955 | Fontaine . |
| 3,314,691 | 4/1967 | Georgi ...................................... 280/434 |
| 3,318,616 | 5/1967 | Fontaine . |
| 3,535,679 | 10/1970 | Connors . |
| 3,844,584 | 10/1974 | Fontaine . |
| 3,924,909 | 12/1975 | Kent . |
| 4,169,635 | 10/1979 | Szalay . |
| 4,549,745 | 10/1985 | Barr ........................................ 280/434 |
| 4,752,081 | 6/1988 | Reeners . |
| 4,805,926 | 2/1989 | Mamery ................................... 280/433 |
| 4,946,183 | 8/1990 | Benson . |
| 5,165,714 | 11/1992 | Kaim . |
| 5,263,856 | 11/1993 | Huehn . |
| 5,431,424 | 7/1995 | Colwell . |
| 5,456,484 | 10/1995 | Fontaine . |
| 5,516,138 | 5/1996 | Fontaine . |
| 5,641,174 | 6/1997 | Terry . |

*Primary Examiner*—Kevin Hurley
*Attorney, Agent, or Firm*—Bradley Arant Rose & White LLP; Thad G. Long

[57] ABSTRACT

A mechanism is provided for a fifth wheel to eliminate squirting and to provide automatic adjustment for slack in the locking system. The mechanism is able to keep the wedge and jaw of a fifth wheel locking mechanism and trailer king pin within specified ranges of tolerance. The mechanism utilizes a self-adjusting or automatic ratchet lock system which may be positioned to work in relation to the operating handle or lever arm and utilize the leverage forces available allowed by the design of the lever arm. The invention also provides for a fully retractable lock release pull handle which may be retracted into the fifth wheel whether the locking mechanism is open or closed. The invention further incorporates electronic induction switches to indicate open and closed positions of the locking mechanism and to indicate whether the king pin is properly seated in the locking mechanism. The design further incorporates replaceable strips of high impact resistant, low friction material in the top plate which eliminates the necessity of grease lubricant on the top surface.

31 Claims, 11 Drawing Sheets

AUTOMATIC TOLERANCE REDUCING GREASELESS FIFTH WHEEL USING A WEDGE AND JAW LOCKING SYSTEM THAT ELIMINATES SQUIRTING

FIELD OF THE INVENTION

This invention relates to fifth wheels and mechanisms for maintaining proper locking of latch mechanisms of fifth wheels. More particularly, this invention relates to mechanisms designed to eliminate the necessity of grease to lubricate the contact between a fifth wheel plate and a trailer riding plate, and features automatic adjustment to maintain tolerances between a trailer king pin and the locking jaw of a fifth wheel thereby automatically adjusting for slack.

BACKGROUND OF THE INVENTION

Inventions relating to the current subject matter have progressed since the mid 1940s. Since that time the inventor of the current invention has been active in this art and has designed and patented numerous mechanisms to eliminate slack between king pin of trailers and fifth wheel locking mechanisms. His experience with fifth wheels began during World War II when the military conducted studies of fifth wheel designs at the U.S. Government Ordinance and Engineering Department at Fort Belvoir and Aberdeen Maryland Proving Grounds. That testing led to the observation that the Government specifications for fifth wheels would allow wearing between king pins and locking mechanisms to such a degree that the slack created from such wearing caused damage to the drive train of the tractor and breakage of fifth wheel components which were, at that time, primarily steel castings.

For the most part, the trucking industry, as it has evolved since the 1940s, has relied on conventional fifth wheel designs for locking onto and supporting tractor trailer king pins. Such designs have incorporated features such as non-retracting lock release handles when the lock is in an open position, spring operated locking jaws, wedges and locking jaws opening on the rearward side of the fifth wheel hub, and wedge/jaw timers. Notwithstanding advances in fifth wheel designs such as those by the current inventor as described in U.S. Pat. Nos. 2,456,826, 3,844,584, 5,456,484 and 5,516,138, herein incorporated by reference, there is still a need to address and solve problems which remain inherently in fifth wheel/king pin coupling due to the forces of tremendous weight and leverage place on the locking mechanism and king pin while the tractor and trailer are engaged.

The inherent problems arise due to wear that increases tolerances between the king pin and locking mechanism. In some instances it has been found, notwithstanding measures designed to keep locking mechanism's elements in place, that the locking elements will slip from a fully locked position towards an unlocked position. Such movement caused by the king pin (i.e. squirting), forces the operating handle (lever arm) to move towards the open position with such force that a clicking or banging is noticeable by the tractor operator. Moreover, such force (squirting) may cause the jaw and wedge to jam in a partial open condition.

Some causes of slack and wearing have been addressed by inventions of the inventor such as disclosed in U.S. Pat. No. 2,726,878 in which the timing of the engagement of the lock jaw and wedge was designed to allow proper coupling of the lock jaw and wedge. In addition to incorporation of the timer, the lockjaw and wedge included angled wedge/jaw contact to allow for adjustment for wear when the wedge moved into locking position.

The design disclosed in the "878" patent has influenced the designs of other fifth wheel manufacturers in their effort to eliminate slack in the locking mechanism and was additionally the prime reason for the inventor's fifth wheel company becoming number one in the industry. Although the design of the 878 patent proved adequate over many years, the fact that the top contact plate between the fifth wheel and trailer was coated with grease allowed for such grease to seep down into the wedge and locking jaw elements. The presence of grease on these components causes the wedge and jaw to slip under the pressure of the king pin thereby causing such components to favor movement toward the open position and cause squirting of the wedge. The combination of wear between the jaw and wedge induced by normal operation of the fifth wheel and wear caused by squirting caused increases in tolerances with respect to the wedge, jaw, and king pin.

The issue of eliminating undesirable tolerance increases has been addressed in prior work of the inventor. U.S. Pat. No. 3,844,584 describes a jaw and wedge having a stepped mating surface the design of which was intended to eliminate sliding forces between the jaw and wedge caused by force applied due to the trailer king pin. The stepped design was contemplated to eliminate movement between the locking jaw and wedge by the presence of surfaces perpendicular to the force applied by the king pin. However, the stepped design has failed to solve the squirting problem because of three reasons. First, upon repetitive locking and unlocking the mechanism, the sliding action of the wedge in contact with the jaw causes the steps to wear down due to uneven sliding contact. This wearing causes the stepped contact surface areas to decrease with usage (approximately a two year period) thereby allowing the force applied by the king pin to generate squirting. Second, it is nearly impossible to keep heavy grease applied to the upper surface of the fifth wheel from seeping into the locking mechanism's wedge and jaw. The presence of such grease causes the wedge and jaw to tend towards slipping towards an unlocked position due to the reduction of friction between the wedge and jaw contact surfaces thus facilitating further wearing down of the stepped surfaces and promotion of squirting. Third, the wedge and jaw, being engaged towards the closed position primarily by coil spring force and a tolerance allowance of lateral movement of the lever arm toward an open position of about two inches when worn, inherently create "play" in the locked mechanism having a stepped wedge and jaw as well as virtually all prior described fifth wheel arrangements having a sliding wedge and jaw arrangement.

Other inventions respecting fifth wheel designs by the inventor have contemplated use of stepped arrangements associated with the wedge. In inventor's U.S. Pat. No. 3,318,616, a fifth wheel design is disclosed wherein a locking jaw of a rotating hook design is urged to remain in locking position by a wedge. Associated with the wedge is a pivoting locking dog having a detent which may be engaged with a rack carried by a frame portion of the fifth wheel. Although the locking dog was intended to maintain the position of the wedge, pressure from the king pin caused the urging of the locking jaw towards the open position whereby a maximum of pressure force was generated on the wedge which in turn applied force directly on the detent. In some instances the force applied to the locking dog and its detent was great enough to cause jamming of the detent in its engagement with the rack thereby making opening the locked mechanism problematic. Although the rack and detent arrangement of the "616" patent looks similar to the current invention, such earlier concept had no relation to the functionality or purpose contemplated in the present invention. The prior use of a rack and locking dog detent was for the purpose of only locking the king pin locking hook member and wedge in a closed position. Without such detent and rack no adequate means, except for the safety catch of the handle on the perimeter of the fifth wheel, could keep the rotating locking jaw from being urged in the open position.

Additionally, such design did not provide an auxiliary safety lock mechanism for the lever arm. Instead, the design required the addition of a safety lock at the perimeter of the fifth wheel which required the operator to release with one hand prior to pulling the handle with the other hand, which operation proved inconvenient as opposed to a direct pull on the handle with just one hand. Moreover, the 616 rack and detent design was integrally connected with the wedge and did not function to affect tolerances and did not incorporate the benefits of leverage allowed by the lever arm (which operates the opening and closing of the locking jaw and wedge) as is the case with the current invention's locking mechanism which uses sliding wedge and jaw members.

Still other inventions used in the trucking industry include safety catch members associated with the linear travel of non-retractable pull handles (i.e. the pull handle which is pulled outward from the fifth wheel by the operator to disengage the locking mechanism and which must remain extended outward and above the tractor tires when the locking mechanism is in the open position). In U.S. Pat. No. 5,641,174, a conventional fifth wheel is disclosed in which as much as two inches of play is allowed in the movement of the operating handle (lever arm) towards the open position before a safety catch is engaged. The problem with such single step safety catches is that large tolerances allowed by the movement of the operating handle before engagement of the safety catch allow for unacceptable slack to be generated promoting severe squirting. Moreover, the single position lock design, as disclosed in the "174" patent, may not allow proper engagement of the safety lock when the slack adjustment knock out rod is incorrectly adjusted by the operator. Further, the safety lock could fail to engage because the 174 design was subject to failure of the wedge and jaw properly locking where an auxiliary spring used in connection with the timer failed or was installed incorrectly. If the safety lock does not properly engage, severe squirting may generate enough force to push the lever arm towards the open position and if the safety lock is not properly engaged, there is the possibility of the lock releasing the king pin with potentially catastrophic consequences of the trailer becoming disengaged from the tractor.

Whereas the single step safety lock design of the invention described in the 174 patent will allow approximately two inches of lever arm movement at the safety lock when the wedge and jaw are worn, the current invention significantly avoids such play because the self-adjusting stepped design at the safety lock restricts the movement of the lever arm to one half inch maximum movement regardless of the condition of the jaw and wedge. Consequently, the current invention will restrict any banging effect whether or not the wedge is worn and further reduce significantly any force on the handle caused by fore and aft movement of the king pin.

A preferred embodiment of the current invention further allows the self-adjusting ratchet system to act as a safety lock. Moreover, the system is designed to follow a movement of the lever arm towards the closed position which self-adjustment will allow the wedge to compensate for a no less than one quarter inch lateral slack adjustment of the wedge for each step of adjustment in the system's ratchet rack. Whereas the 878 design could adjust the positioning of the wedge and jaw due to coil spring action, the 878 design could not prevent the occurrence of squirting caused by grease accumulation between the jaw and wedge because it had no inward self-adjusting ratchet catch system. Additionally, the invention disclosed in the 174 patent, as it has been produced and used in the field, could not make such an inherent adjustment due to the fact that the pull handle shaft was not long enough thereby causing the external hand grip of the pull handle to abut the outside perimeter of the fifth wheel preventing any inward movement of the operating handle thereby preventing slack adjustment necessitated by wear of the jaw and wedge. The 174 patent thus failed the basic feature embodied in the inventor's first U.S. Pat. No. 2,456,826, herein incorporated by reference, the embodiments of which have been practiced in the art for over 40 years and proven valuable in the trucking industry.

Like the "826" patent, a preferred embodiment of the current invention also permits adjustment for slack due to worn jaws and wedges. An additional advantage of the current invention is that because of the self-adjusting feature allowed by the ratchet system, a need to replace jaws and wedges is eliminated.

In the current invention stepped surfaces between the wedge and jaw are not necessary to decrease the slack caused by grease induced wear between the jaw and wedge. Instead a smooth surface between the jaw and wedge may be used allowing for less expensive manufacturing of such parts. Moreover, it does not matter whether grease becomes applied to the jaw and wedge. The inventor's experience has further proven that a smooth contact surface between the jaw and wedge will provide much better friction than stepped jaw and wedge contact surfaces when the contact surfaces are worn.

Further, it has been discovered by the inventor that application of the current invention provides for maintenance of narrower tolerances between king pin and jaw without the possibility of squirting. Additionally, the self-adjusting engagement of the wedge and jaw is able to be maintained in the closed position, which maintenance is benefited from the lever arm arrangement of the internal operating handle (lever arm) by both reducing the force applied to the detent and rack caused by the king pin and generating markedly tighter tolerances of movement between the jaw and wedge. Squirting and slippage is essentially eliminated, regardless of the presence of grease or worn components. Moreover, the design of the multi-positions (i.e. steps) of the self-adjusting ratchet system eliminates the human element involved in making sure the lever arm has fully closed and properly engaged the safety catch.

Integral to the advance in tightening tolerances of the current invention, a fully retractable pull handle is incorporated in association with the lever arm actuated detent and rack. There is a long felt need for this advancement in the art due to severe problems that have been caused by non-retractable type handles. As can be attested to by the presence of truck tire treads commonly found on the nation's highways, truckers have found that when the tractor is traveling without a trailer and the locking mechanism of the fifth wheel disengaged, since the non-retractable pull handle is extending over the tractor's tires, if a tire tread separates at high speeds, the centrifugal force of the tread slamming against the extended pull handle will often bend the shaft of the pull handle so that the locking mechanism is inoperative. Moreover, in many instances, if the shaft was improperly rebent to correct the damage done by the tire, the shaft was still not properly straightened leading to an inability of the locking mechanism to properly engage. Additionally, such non-retractable handles can be damaged by the trailer king pin if the tractor is backing into place improperly to engage the king pin into the fifth wheel. There have also been instances where the tires themselves of tractors equipped with air suspensions have bent an extended pull handle.

In a previous retractable handle design of the inventor in U.S. Pat. No. 4,946,183, the pull handle was able to retract only partially into the fifth wheel. The handle had a notch cut into one side of the handle shaft which acted as a safety catch and the slot allowing for retraction was L-shaped. In order for the handle to be retracted into the fifth wheel, the handle had to be manipulated laterally in order for the connecting bolt between the pull handle and operating handle to be slid along the slot in the pull handle for retraction of the pull handle when the operating handle was in the open position. This manipulation proved inconvenient. Moreover, since the pull handle did not fully retract, it was still subject to damage by separating tire treads. Also, the safety catch could fail to properly engage where the operating handle did not swing into a fully closed position.

In the current invention the retractable handle is able to fully retract whether the locking mechanism is open or closed and is not affected by type of tractor suspension, separating tire treads, or trailer king pins. Additionally, the slot is completely linear and not dependant upon any manipulation to retract. Moreover, there is no need for a safety notch because the ratch system acts as its own safety catch.

In association with the retractable handle yet another advance is incorporated in the current invention. Due to the design of the lever arm extending beyond the perimeter of the fifth wheel plate, the operator may visually tell from such visible portion, by the lateral or forward position of the lever arm extension, whether the locking mechanism is open or closed. Additionally, it is known that truckers often must operate their tractors during inclement weather conditions and at night. Moreover, all manufacturers specify in their operating instructions to examine the fifth wheel from behind (one even suggests using a flashlight if necessary) to determine whether the locking mechanism has actually locked. Such action by the operator is rarely carried out because to check the locked position of the fifth wheel from behind would require the driver to check the lock from under the trailer. Incorrect locking has been attributed to the most frequent cause of trailers becoming uncoupled over the past fifty years. Therefore, the current invention incorporates not only the extension of the lever arm to indicate whether the mechanism has locked but also includes as elements induction switches located so as to properly indicate whether the lever arm (thus, locking mechanism) is positioned in the open or closed position, and whether the trailer plate is resting or contacting the fifth wheel properly.

Prior inventions which have included electronic indicator switches include inventors U.S. Pat. No. 5,456,484 in which a button switch was placed so as to become depressed when the forward end of the wedge became seated in the locking position. However, the position of this switch negated the possibility of the wedge to adjust farther in the locked position as the wedge became worn thereby making any adjustment for slack impossible. Moreover, such switch was subject to malfunction due to grease buildup. Additionally a push button switch has been utilized in U.S. Pat. No. 3,535,679 wherein a lever arm having a hook lock mechanism would activate the switch when the lever arm was in a closed position. Unlike the present invention, the lever arm of the "679" design had only two positions of movement, open or closed. It could not adjust for wear induced slack. In contrast, the indicator switch of the present invention is able to activate when the lever arm is in the closed position while allowing for the lever arm to self adjust as needed. This advance is due to the use of an electronic switch in the form of an induction switch. Likewise, the ability to detect whether the trailer plate is resting or contacting the fifth wheel properly is also allowed by an induction switch.

Yet another embodiment of the invention incorporates a means by which a fifth wheel may support a trailer via the trailer riding plate without the use of a grease-based lubricant and further without the mating surfaces of the trailer plate and fifth wheel binding. Specifically, the current invention solves the long felt need recognized since the early days of the industry for a means to create a non-binding surface between the trailer plate and fifth wheel without a need for grease. The use of grease as a lubricant has always been the means for creating non-binding surfaces between the trailer and fifth wheel. However, the presence of grease has always presenting a great deal of handling problems for the operator. For example, when a fifth wheel required repair, the grease made for exceptionally messy work environments in the repair shop. Moreover, not only does the grease seep into the locking mechanism elements thereby facilitating wearing and squirting, the grease also attracts road grit which gums up the locking mechanism components and in frigid environments of winter months, the grease will solidify sometimes freezing causing the locking elements to become inoperative. The cost of grease and labor to install is eliminated. The tractor becomes much easier to clean and stays clean longer. Weight is also reduced because there is no mud and dirt which are normally attracted by grease.

The current invention has solved the grease problem by incorporating into the fifth wheel plate materials having properties of a low coefficient of friction, high density, low compressibility, and high impact resistance. Such material is recessed into the top plate in the form of a plurality of strips which are embedded deep enough in the top plate to protect such strips from damage or distortion especially when the trailer plate slides on the fifth wheel during coupling. The strips are further raised $1/16$th to $1/8$th inch above the surface of the fifth wheel plate so as to keep the trailer plate from contacting the fifth wheel plate.

The strips out perform and operate in a functionally different manner than other grease avoiding component designs because of the unique spacing and manner of incorporation. In other inventions such as disclosed in U.S. Pat. Nos. 3,924,909, 4,169,635, 4,752,081, 5,165,714, 5,263,856, and 5,431,424 a high molecular weight polyester material and other composite materials were either bonded, welded, or bolted to the surface of the fifth wheel top plate. Moreover, such prior designs required a substantial surface of the fifth wheel plate to be covered by such materials. Some designs comprised whole sheets of the plastic material covering the entire plate while others comprised large plastic plates. Practical use of such designs has proven unsatisfactory in the long run due to abrasive or disruptive action of the trailer plate scraping across the surface of the fifth wheel when coupling. For example, the use of plastic sheeting failed due to wrinkling, dislodging, or ripping of the plastic from its intended position. The current invention provides a unique means of providing for protection by inserting the low friction composite material within depressions incorporated directly into the surface of the fifth wheel plate. Moreover, the low friction material of the current invention requires that only narrow strips of material be used such that the strips rise above the surface of the metal plate by only 1/16th to 1/8th inch. Thus, the over all profile of the fifth wheel plate is lower that other greaseless designs. The capacity for utility with such narrow bands of material is provided by the fact that the material applied in the current invention has a lower coefficient of friction and higher impact resistance that used in prior methods.

SUMMARY OF THE INVENTION

By the present invention a fifth wheel is provided which maintains a sliding wedge and jaw in proper locked position.

It is an object of the invention to provide a means whereby the problem of squirting is eliminated.

It is another object of the invention to provide a means whereby the wedge and jaw are kept within a specified range of tolerances respecting the jaw and king pin. It is a further object of the invention to provide a means for the wedge to adjust for a maximum of one thirty-second inch slack between the locking jaw and king pin. It is a further object of the invention to provide a means whereby the wedge will be allowed a maximum of one quarter inch slack adjustment per increment of lever arm adjustment.

It is another object of the invention to keep the wedge and jaw in proper position by application of a self-adjusting ratchet catch lock system associated with the lever arm and pull handle. It is a further object of the invention to provide a ratchet catch lock that is automatically released by the pull handle when said handle is pulled outward from the fifth wheel to a position just prior to engaging the lever arm for unlocking the jaw and wedge.

It is yet another object of the invention to utilize the leverage available from the lever arm member to lessen the forces applied to the self-adjusting ratchet catch lock assembly.

It is yet another object of the invention to utilize the arc of travel available from the outer end of the lever arm to provide a means not only for lessening the forces applied to the self-adjusting ratchet but also for providing a linear distance of travel over which a self-adjusting ratchet mechanism may be applied.

It is yet another object of the invention to provide a fully retractable pull handle and which can retract into the fifth wheel whether the locking mechanism is open or closed.

It is yet another object of the invention to provide a fifth wheel having a lever arm which extends beyond the outer perimeter of the fifth wheel plate thereby providing a visual cue as to whether the locking mechanism is in an open or closed position.

It is still another object of the invention to provide an electronic sensor capable of determining whether the locking mechanism is in an open or closed position. It is a further object of the invention for such electronic sensor to be incorporated in the form of an induction switch. It is yet a further object of the invention for said sensor to determine the position of the lever arm. It is still a further embodiment for such sensor to be associated with an indicator light or alarm connected to the interior or exterior of the tractor cab.

It is yet another object of the invention to provide an electronic sensor capable of determining whether a trailer's king pin has been properly engaged by the fifth wheel locking mechanism. It is a further object of the invention for such sensor to be incorporated in the form of an induction switch which is located on the fifth wheel plate such that it may detect within measured tolerances a distance between the fifth wheel plate and the trailer riding plate and/or whether the trailer plate is bearing on the fifth wheel plate.

It is still a further embodiment for such sensor to be associated with an indicator light or alarm connected to the interior or exterior of the tractor cab.

Yet another preferred embodiment of the invention is a means to provide a low friction contact surface incorporated into the upper surface of the fifth wheel plate so as to avoid the requirement of a grease lubricant. A further embodiment of this element provides for a plurality of high density, low compression, high impact resistance, and low coefficient of friction strips placed transversely across the fifth wheel plate. It is a further embodiment that the strips be placed on either side of the fifth wheel's fulcrum. It is yet a further embodiment that said strips be semi-permanently mounted to the plate by means such as counter sunk bolts or screws.

DETAILED DESCRIPTION OF THE PREFERRED EMBODIMENTS

Figure 1:
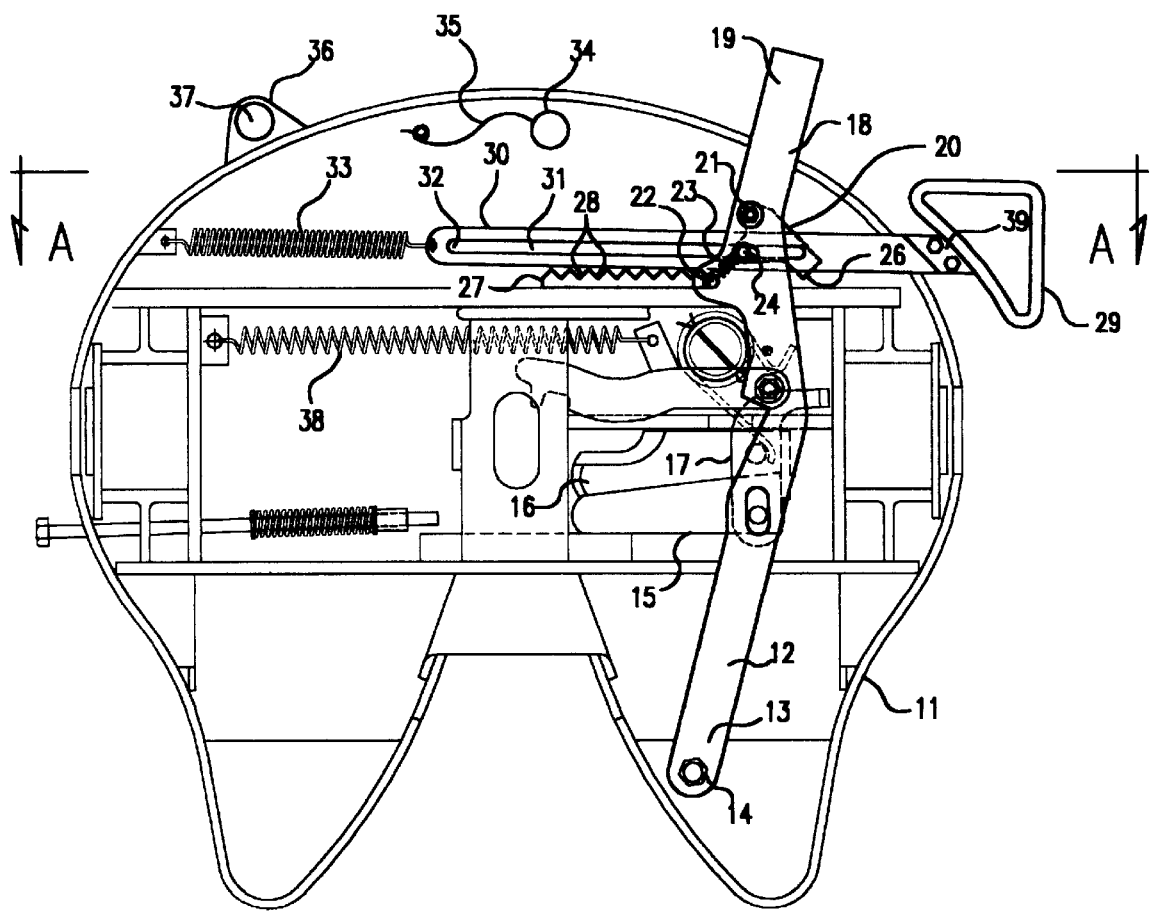
FIG. 1 is a plan view of the fifth wheel of the current invention showing incorporation of the retractable handle and self-adjusting ratchet system in an open position.
Figure 2:
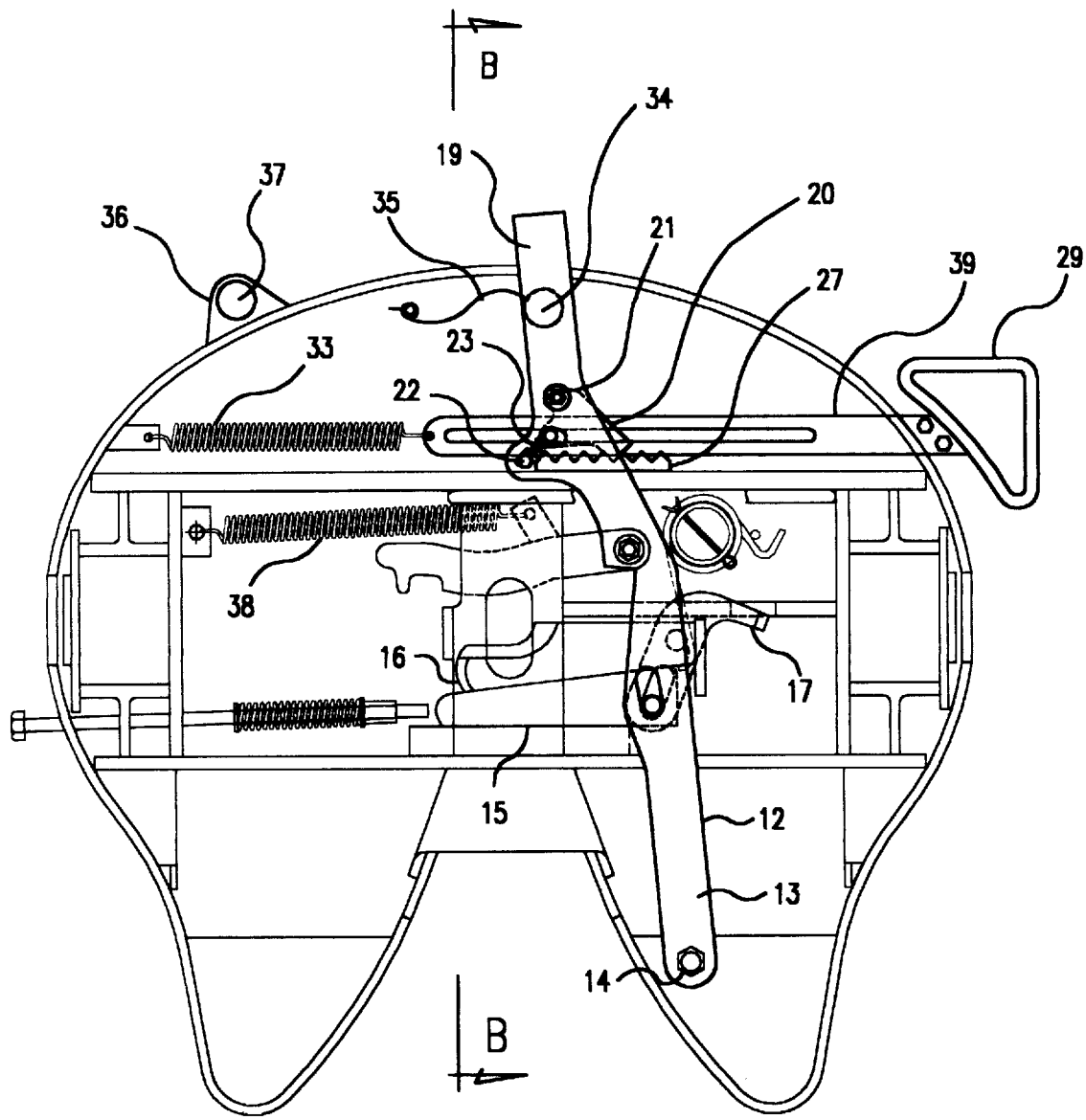
FIG. 2 is a plan view of the fifth wheel of the current invention showing incorporation of the retractable handle and self-adjusting ratch system in a closed position.
Figure 3:
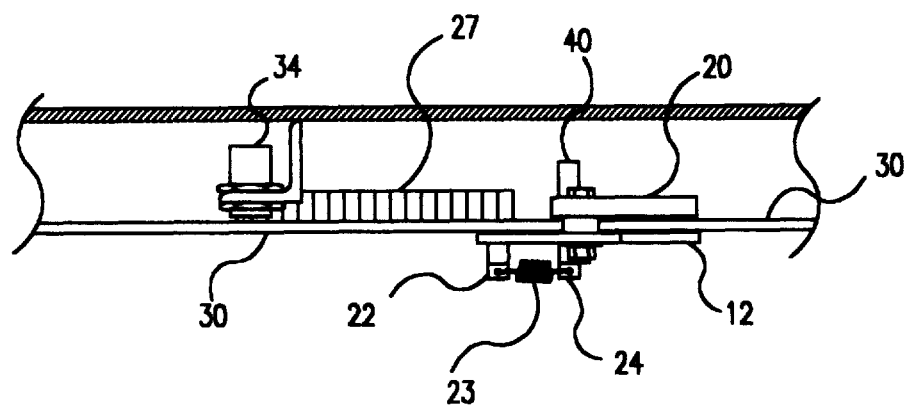
FIG. 3 is a partial frontal side view along line A—A of FIG. 1 showing induction switch sensor, and disengaged rack and rack catch dog.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose and which may be described by different terminology elsewhere. Moreover, not all elements of the fifth wheel shown in the drawings are discussed explicitly as they are described as to their functionality in the patents specified earlier which are incorporated herein by reference.

With respect to the drawings, referring to FIG. 1, fifth wheel 11 has a sliding jaw 16 and wedge 15 locking mechanism which is generally urged into an open or closed position by arcuate movement of lever arm 12. Lever arm 12 has a proximal end 13 and a distal end 18. Lever arm 12 is pivotally connected to the super structure of the fifth wheel 11 by pivot bolt 14 at proximal end 13. At a distance along lever arm 12 lock jaw 16 and wedge 15 are integrally associated with lever arm 12 through timer assembly 17. The arcuate distance over which lever arm 12 may travel at the position of the jaw 16 and wedge 15 is measurably less than the arcuate distance over which the distal end 18 of lever arm 12 may travel. Thus, the force which must be applied in order to urge lever arm 12 towards an open position if such force is applied in the vicinity of the jaw and wedge is measurably greater than the force necessary to be applied for such urging near the distal end 18 of lever arm 12. The result of the effect of leverage created by the lever and fulcrum arrangement of the lever arm 12 is that, in the first instance, little force is required to be applied at the pull handle 39 to urge the lever arm 12 when the pull handle 39 engages the lever arm 12 towards an open position, and in the second instance, the force applied on the jaw 16 and wedge 15 by a king pin and translating to the lever arm 12 is countered by the less force necessary to oppose such king pin created force due to the leverage available farther out on the lever arm due to coil spring 38. A net result which is a material component of the invention is that measurably little force is applied to the ratchet assembly in keeping the ratchet catch 26 of the ratchet dog 20 engaged with the ratchet rack 27.

Another effect of the leverage available is that the inward urging force created by coil spring 38 causes a greater force than the opposite force caused by a king pin acting on the jaw 16 and wedge 15 such that the arcuate travel of the lever arm near distal end 18 allows the ratchet system to be self-adjusting through the travel of dog 20 with its ratchet catch 26 along the plurality of steps 28 in rack 27. As the sliding action of jaw 16 and wedge 15 through time cause a wearing of the mating surfaces of the jaw and wedge, thereby creating increasing tolerances between such elements, and further causing a need for increasing inward adjustment of the wedge so as to hold the jaw in proper position, the ratchet catch 26 will be urged by the force of spring 38 to self-adjust its placement along rack 27 and cause the jaw and wedge to be maintained in locked position with tight tolerances. The design of the ratchet system of the current invention restricts the lateral movement of the wedge 15 to no more than one quarter of an inch whether worn or greasy for each step 28 position. The incremental steps 28 of the rack 27 (about one half inch between each step) allows, in total, for over one inch movement of the wedge 15 inward to adjust for slack, and the plurality of steps 28 will restrict movement of the lever arm 12 to only an inward adjustment. The one inch allowable travel of the wedge 15 will adjust for a total of one eighth inch movement fore and aft on the locking jaw 16 while in contrast other locks require replacement as the wear between the jaw and wedge advances the slack between the jaw and king pin to and beyond such one eighth inch tolerance. Consequently, the one inch allowable travel of the wedge translates into one thirty-second tolerance adjustment per step 28 in the rack 27.

Figure 4:
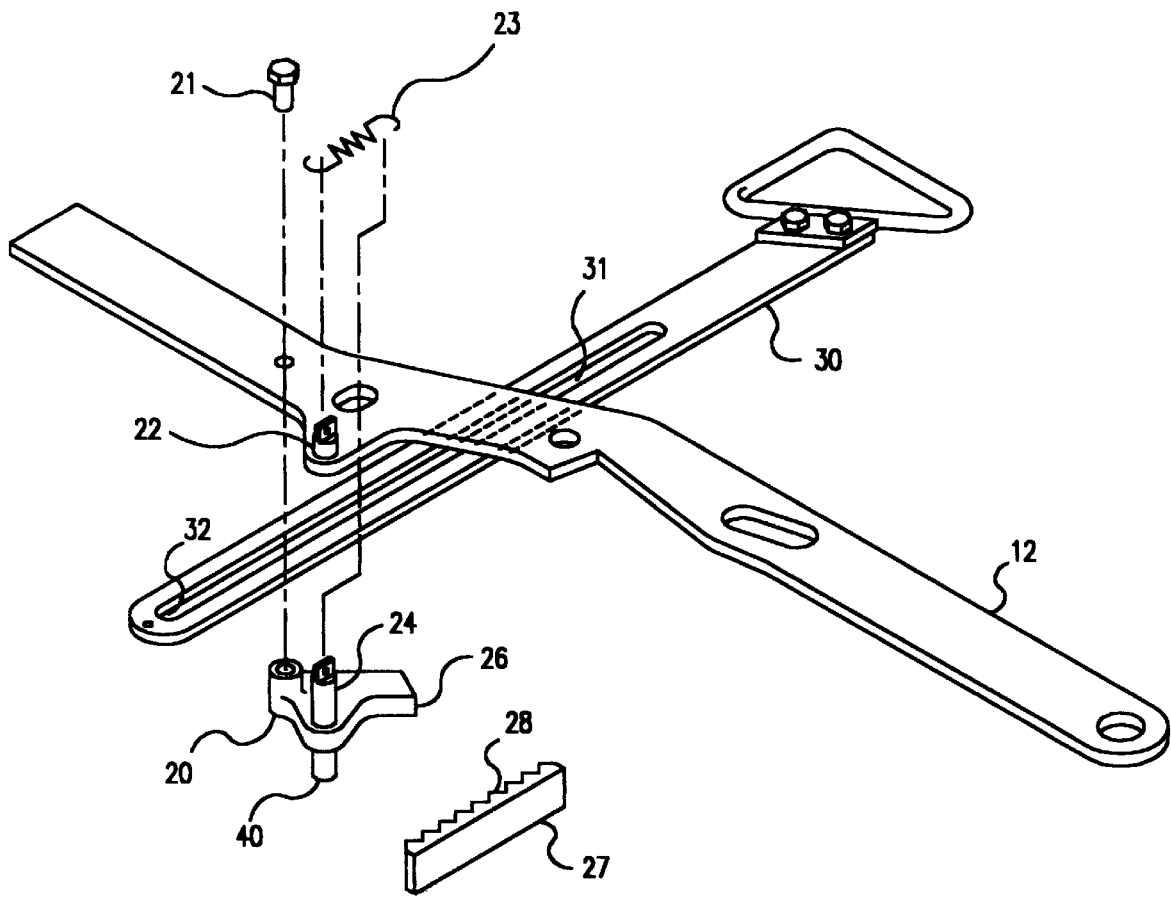
FIG. 4 is an enlarged exploded view of the ratchet mechanism components.

The ratchet system operates in conjunction with the retractable pull handle as follows. Pull handle 39 has handle grip 29 and shaft 30. Shaft 30 has linear aperture 31 along a distance of the shaft 30. Pull handle 39 is continuously urged towards a retracted position by coil spring 33 which is itself connected to a structural component of the fifth wheel 11. Dog 20 is pivotally connected to lever arm 12 by pin 21. Dog 20 has pin 24 which is connected by spring 23 which in turn is connected to lever arm 12 by connecting means 22 such as a screw or pin. Spring 23 urges dog 20 to pivot in arcuate fashion towards lever arm 12. When the lever arm 12 is in a closed position, dog 20 with its ratchet catch 26 will be urged into engagement with steps 28 of rack 27. As pull handle 30 is extracted out of the fifth wheel 11, pin 24 (FIG. 4) becomes engaged by butt 32 in the distal end of aperture 31 in pull handle 39 shaft 30 thereby causing ratchet catch 26 of dog 20 to become rotated out of disengagement from steps 28 of rack 27. Upon disengagement of ratchet catch 26 from steps 28, further extraction of the pull handle 39 forces the lever arm 12 to arc via pressure of the butt 32 acting on pin 24 towards an open position causing disengagement of the jaw and wedge. Additionally, an extension 40 of pin 24 may be utilized for attachment of an air cylinder for the purpose of opening the mechanism. Such cylinders are described in the prior art herein incorporated by reference.

Figure 5:
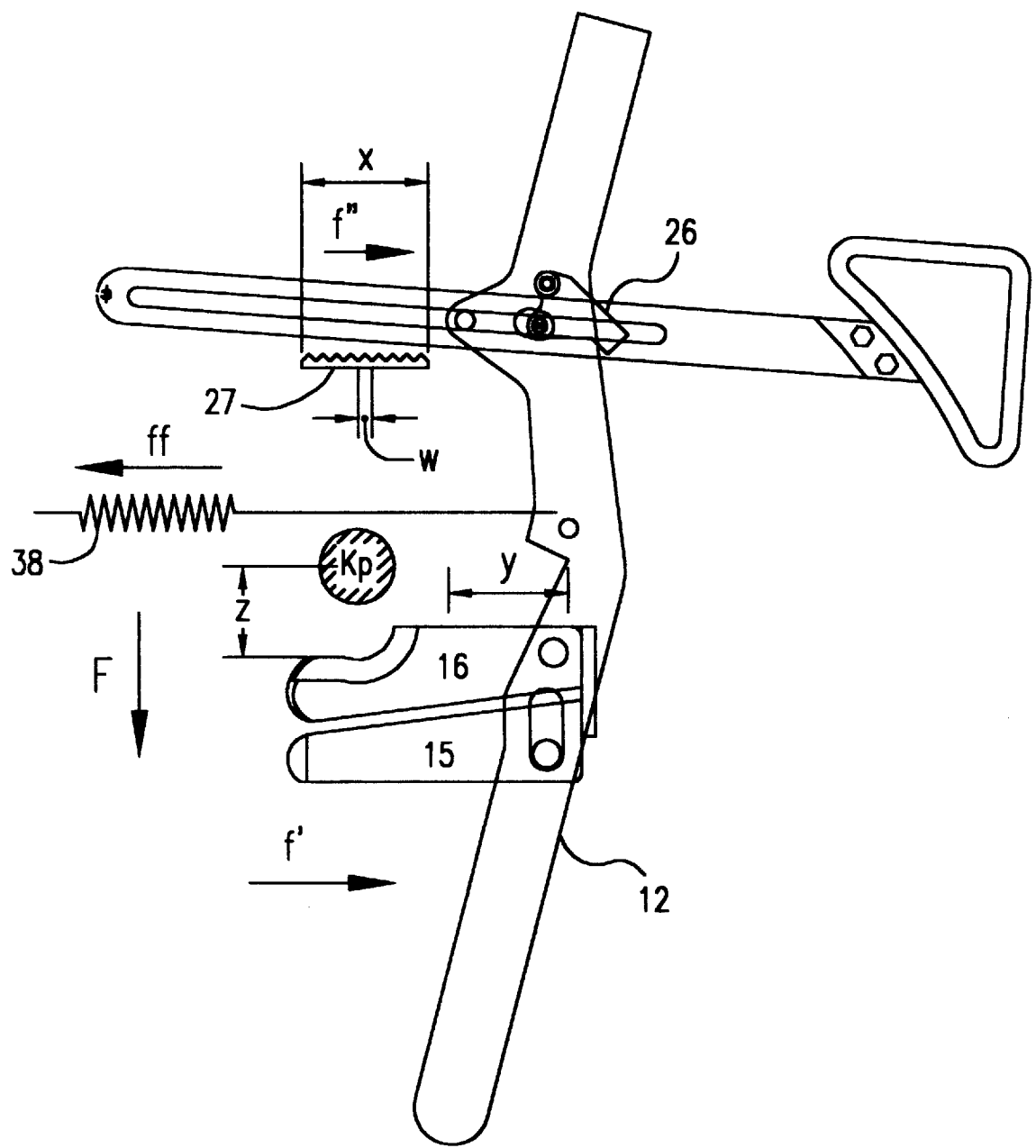
FIG. 5 is a force and tolerance indicator diagram.

Applicable forces and tolerances of movement are indicated in FIG. 5. The point of maximum force F applied to the locking mechanism occurs at the point of contact between the king pin Kp and locking jaw 16. Such force translates to wedge 15 with vector force f'. Because of the angular contact between the wedge and jaw, especially if grease is present between the wedge and jaw, the wedge is urged towards unlocking position, which movement may be caused by force F and is applied to the wedge perpendicular to F to a lesser vector component force f' ultimately onto lever arm 12. Vector force f' is countered by force ff created by coil spring 38. Although force ff is generally great enough to counter force f', typical fifth wheel locking mechanism designs having large tolerances, such as created by worn jaw and wedge elements, will allow squirting of the king pin with such force F that tremendous impact forces may result in increases of force f' large enough to counter force ff resulting in jamming or disengagement of the jaw and wedge. With the incorporation of the current invention, tolerances can be kept to a minimum by the ratchet catch 26 engaged with rack 27 thereby eliminating the ability for the king pin to impart large impact forces F on the locking assembly. Thus, forces f' translated to lever arm 12 can be kept in a range able to be countered by force ff resulting in a minimum of forces translating farther out on the lever arm 12 in the vicinity of the ratchet catch 26 and rack 27. In other words, force f" is minuscule because of the canceling of forces f' from ff.

Referring to FIG. 5, due to the restriction of arcuate movement of the lever arm 12 by the ratchet system, the wedge may not slide by greater than one quarter inch (direction y) when the ratchet catch 26 is engaged with rack steps 28 which in turn limits tolerance between the jaw and king pin to generally one thirty-second inch fore and aft (distance z) per each increment of steps 28. The incremental steps are generally one quarter to one half inch each (distance w) and the rack has a length which will allow the lever arm to adjust up to three and one half inches (distance x).

An induction switch 34 is incorporated beneath the fifth wheel plate at a position above where the distal end 18 of lever arm 12 will rest when in the closed position. Thus, when the locking mechanism is closed, the induction switch 34 will be activated. Means well understood in the electronic arts may be used to couple switch 34 to a light or other indicator in the cab of the tractor via wire 35. Additionally, lever arm 12 includes extension 19 which projects beyond the perimeter of the fifth wheel providing a visual cue whether the locking mechanism is open or closed.

Figure 6:
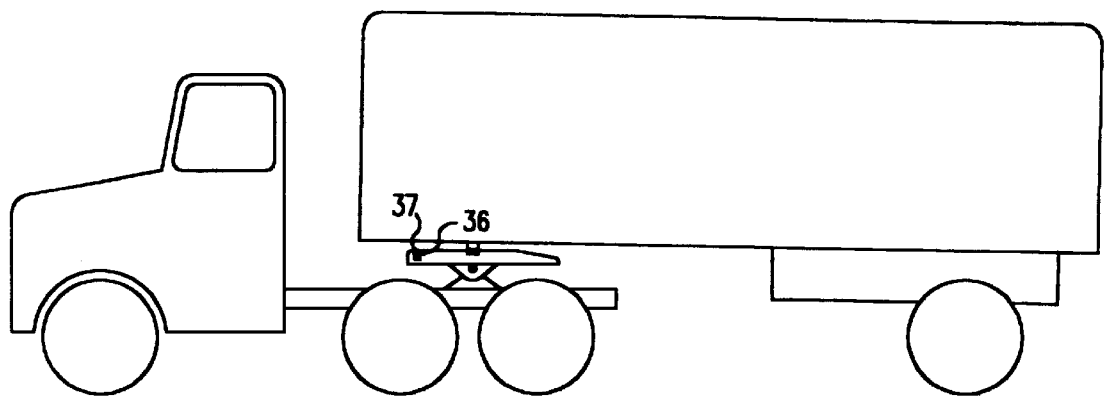
FIG. 6 is a lateral side view showing the relation of a trailer's riding plate to the fifth wheel riding plate when the king pin is improperly engaged and electronic sensor for determining such engagement.
Figure 7:
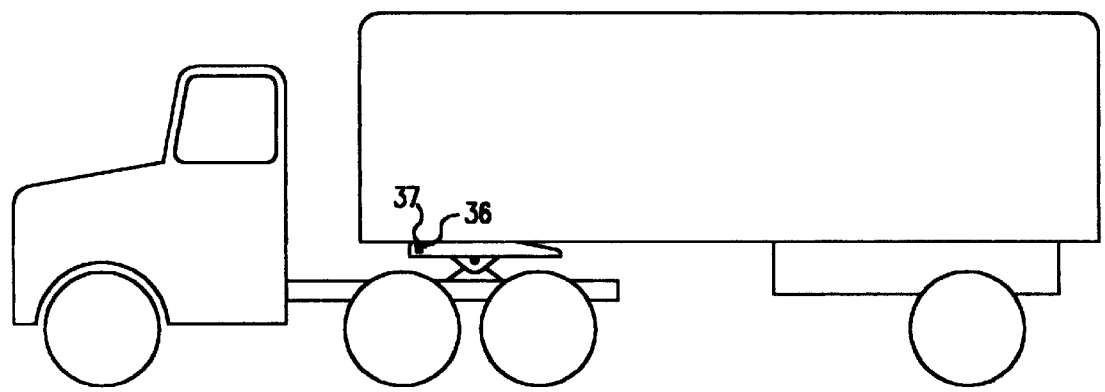
FIG. 7 is a lateral side view showing the relation of a trailer's riding plate to the fifth wheel riding plate when the king pin is properly engaged and electronic sensor for determining such engagement.
Figure 8A:
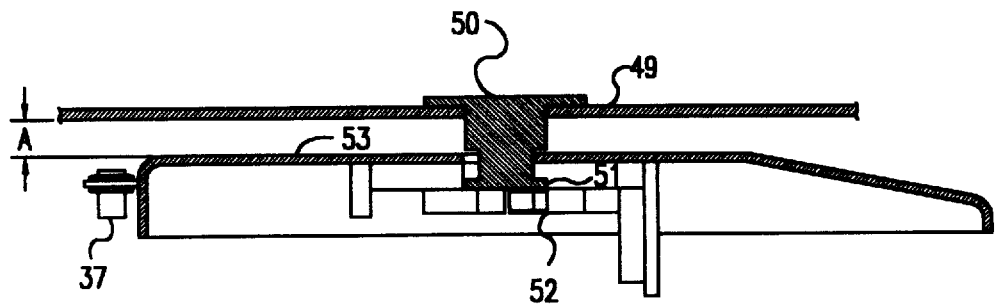
FIGS. 8a and 8b show a detailed side view along lines B—B of FIG. 2 of a king pin improperly and properly engaged respectively, by a locking jaw.
Figure 8B:
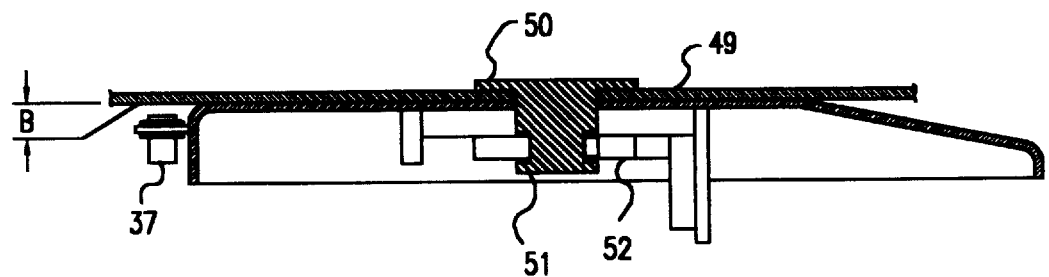

A second induction switch 37 may be incorporated at the perimeter of the fifth wheel plate inside protective housing 36. As indicated in FIGS. 6 and 7, a locking mechanism may be tripped into the locked position by the king pin without the king pin actually being properly engaged by the jaw. This may occur where the king pin is one to two inches too high above the jaw as it trips the locking bumper while the tractor is backed into position with the trailer. The result is that the cap 51 of the king pin 50 will be captured in the well slot but only rest on top of the locking jaw 52 instead of engaged by it as shown in FIGS. 8a and 8b. It is an embodiment of the invention that an induction switch 37 diagnose whether the pin cap 51 is properly engaged by determining the proximity of the trailer riding plate 49 to the fifth wheel plate 53 as shown by measurement differences "A" and "B" (FIGS. 8a and 8b). Such switch may be set within specific safety tolerances which if violated, will activate warning indicators such a lights or alarms in the cab of the tractor.

Figure 9:
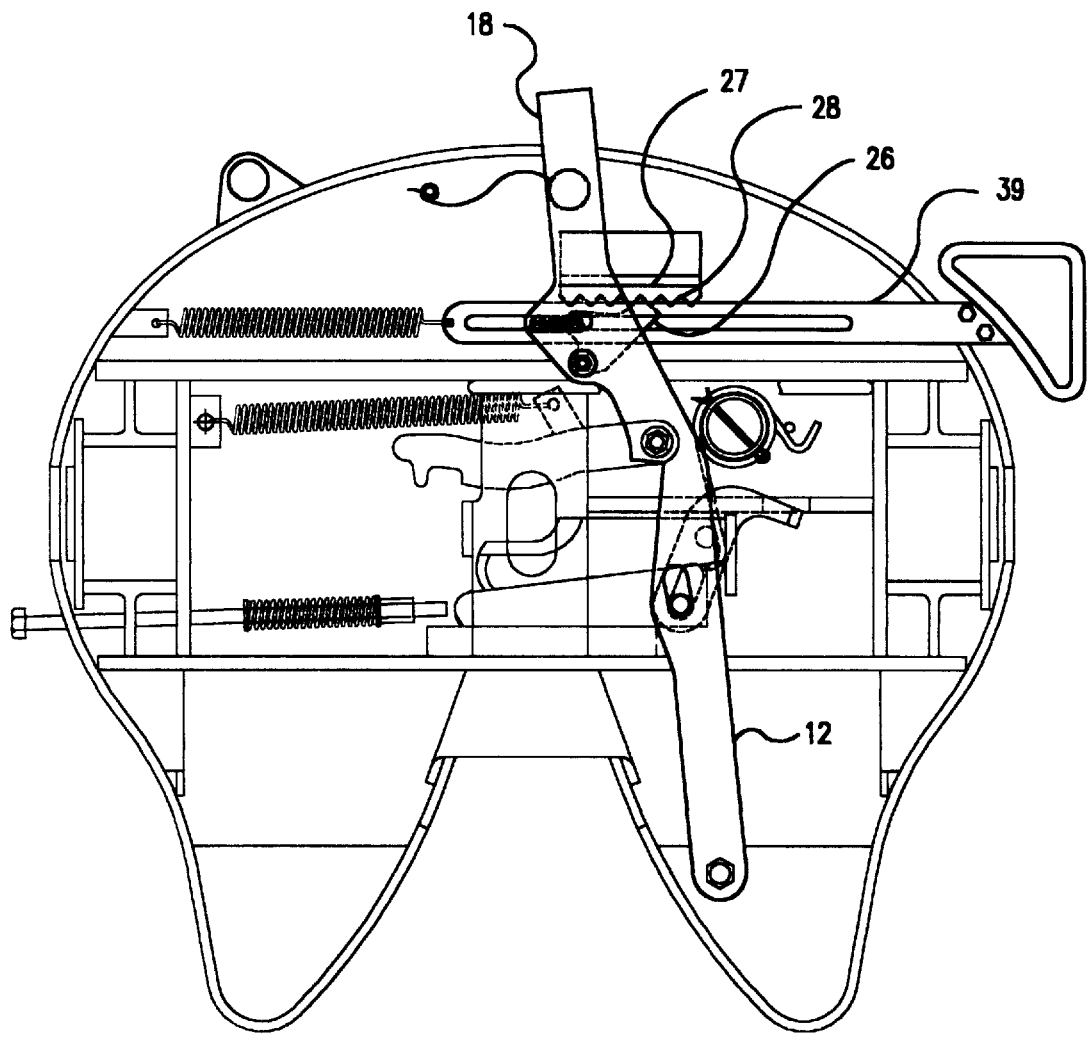
FIG. 9 is a plan view showing a self-adjusting ratchet system placed in a reverse position and associated with a retractable pull handle.
Figure 10:
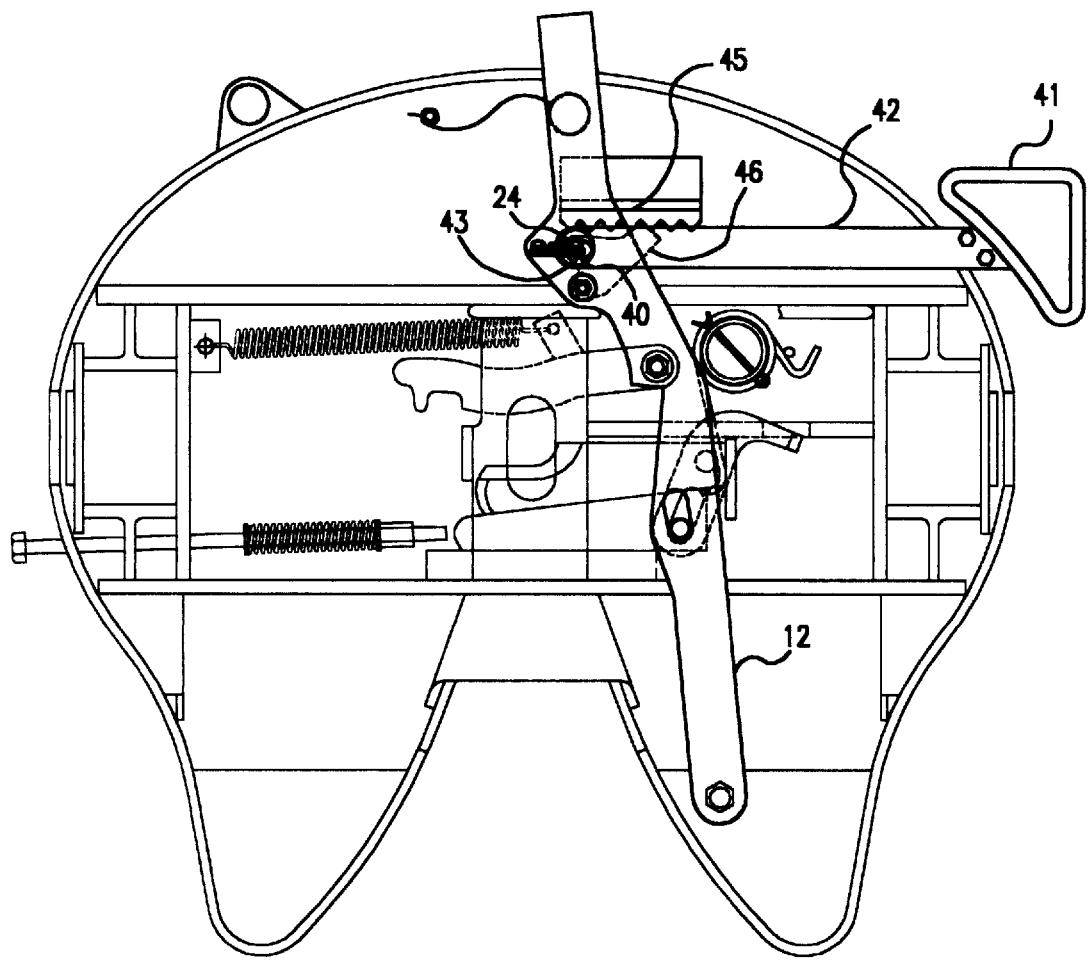
FIG. 10 is a plan view showing a self-adjusting ratchet system placed in a reverse position and associated with a non-retractable pull handle.
Figure 11:
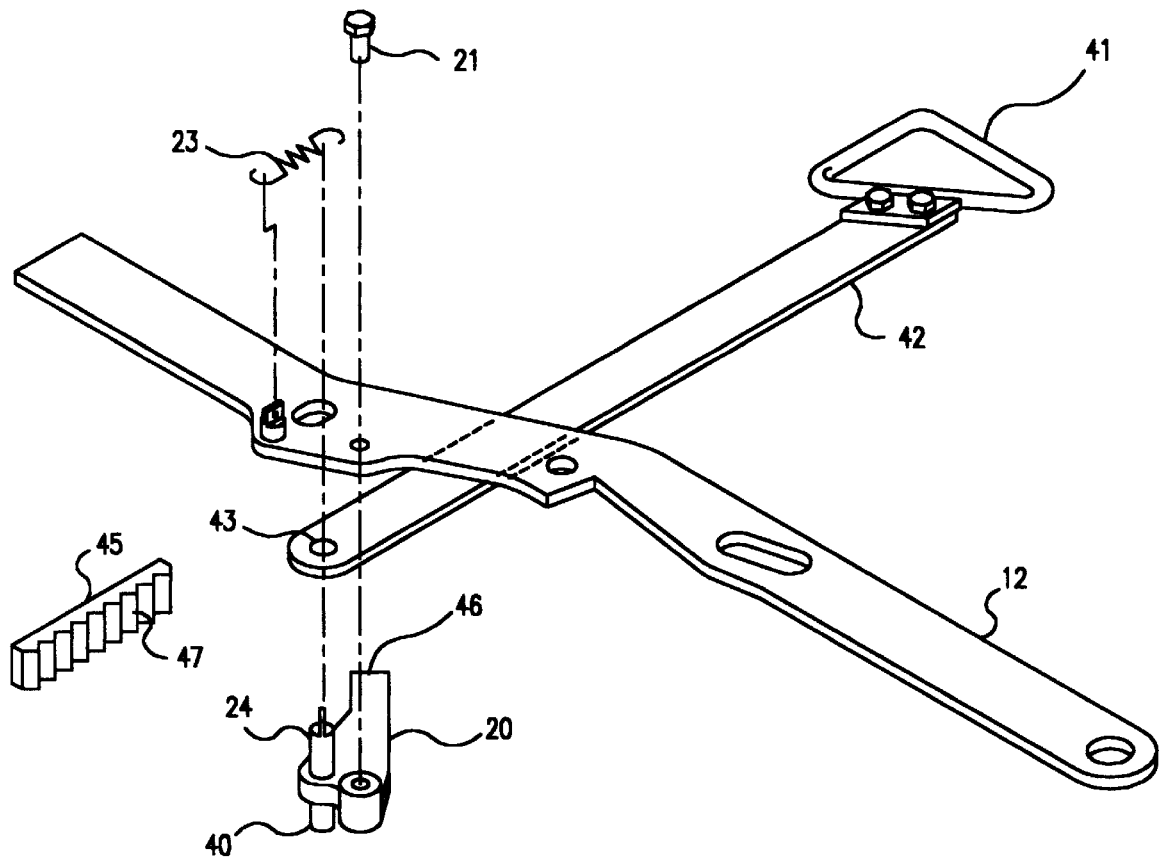
FIG. 11 is an exploded view of the non-retractable pull handle arrangement of FIG. 10.

Another embodiment of the invention provides for a self-adjusting ratchet system associated with a retractable pull handle which such ratchet system is incorporated in a reverse orientation (FIG. 9). Such orientation will incrementally provide greater ease of operation and corresponding less pressure on the ratchet catch 26 engagement with rack 27 steps 28 due to said rack and ratchet catch benefiting from increased leverage forces by being closer to the distal end 18 of the lever arm 12. Likewise, the ratchet system of the current invention may be incorporated in association with non-retractable pull handles by making modifications of the non-retractable pull handle shaft as indicated in FIG. 10 thereby facilitating retrofit of some existing fifth wheel models. Specifically, pull handle 41 shaft 42 may have attached to it pin catch 43 which may be used to engage pin 24 and disengage ratchet catch 46 from steps 47 of rack 45. A extension 40 of pin 24 may be associated with an air cylinder as previously described.

Figure 13:
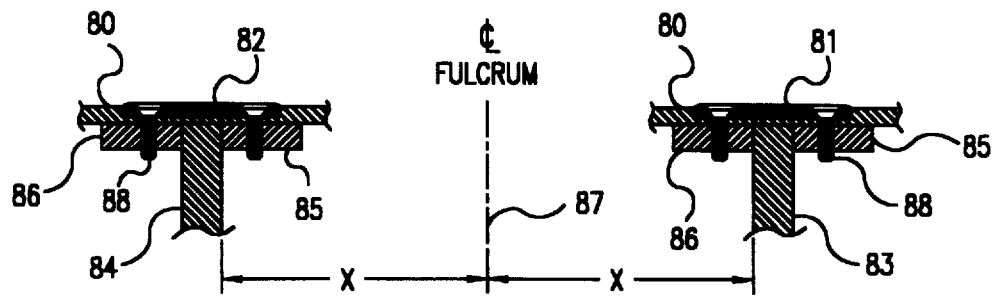
FIG. 13 is a side view to a fifth wheel along line C—C of FIG. 12 showing the low friction strips inserted into their fore and aft strip seats and underlying structural support.
Figure 12:
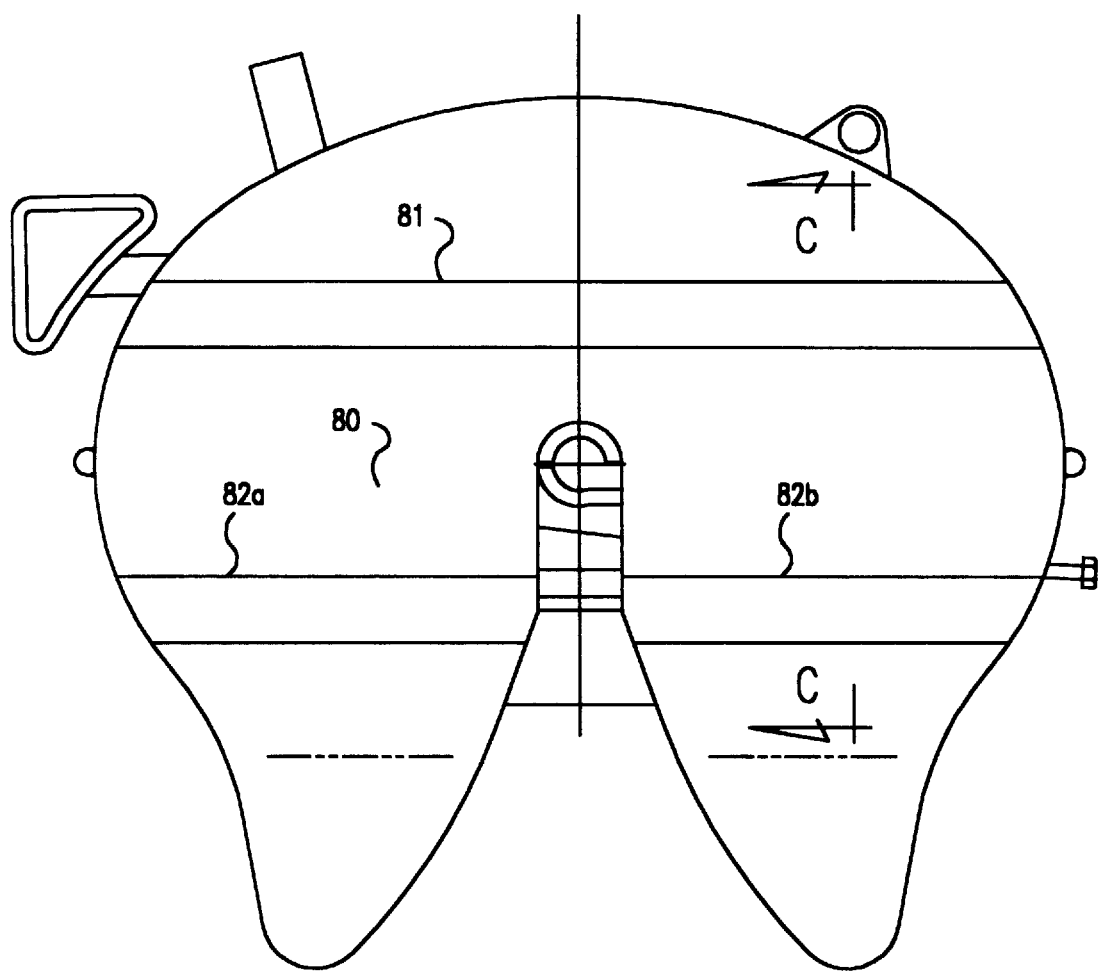
FIG. 12 is a plan view of the top of the fifth wheel having low friction strips incorporated therein.

In a preferred embodiment, (FIG. 12, and 13) the fifth wheel plate 80 has incorporated into it at least two strips 81 and 82a and b no less than one and one half inch in width and three sixteenths inch in depth fitted into slots running transversely to the front of the fifth wheel. The strips 81 and 82a and b are made of a low friction, high density, low compressibility, high impact resistant material such as a 11 to 14% manganese steel such as that produced by the Astralloy Wear Technology P.O. Box 170974 Red Hollow Road, Birmingham, Ala. 35217, or a plastimeric composite such as XYLETHON having a density of 0.97 g/cm$^3$, impact strength of 32.7 Ft lb/in, and a coefficient of friction of 0.08 (static), made by the DuraWear Corporation, 2598 Alton Road, Birmingham, Ala. 35210. A plastimeric composite should have a volume loss of not greater than 5 in a Sand Slurry Test (50/50 water at 1750 R.P.M. for 7 hours). The positioning of the strips follow across the width of the fifth wheel above and supported by the main lateral fore and aft structural braces 83 and 84. The strips are further supported along the length of said strips by structural support members 85 and 86 welded along the underside portions of each slot. Strips 81 and 82a and 82b may be held in place by a plurality of recessed screws or bolts 88 which allow for replacement of the strips. In a preferred embodiment the strips are positioned fore and aft of the fulcrum 87 (support brackets on either side of the fifth wheel) thereby allowing for the center of gravity of weight from the trailer to be properly between the strips. In a further preferred embodiment, the strips are set so as to raise above the surface of the fifth wheel by between one sixteenth and one eighth inch which is enough to allow a useful distance to occur between the trailer plate and fifth wheel thereby avoiding any binding friction to occur between the fifth wheel and trailer plate.

The means by which support strips may be incorporated into the top plate of a fifth wheel may vary according to the method used to manufacture the fifth wheel. Whereas the fifth wheel of the current invention is constructed from cut steel, other fifth wheels are produced from casting steel which is fundamentally structurally different from that of the current invention. Where a fifth wheel is made by casting, the grooves into which low friction strips may be placed may be caused to be structurally sound by increasing the thickness of the cast metal in the vicinity of the grooves.

Although the invention has been specifically shown and described in it's preferred form, it should be understood that any modifications, additions and deletions may be made thereto without departure from the spirit and scope of the invention as set forth in the following claims.

I claim:

1. A fifth wheel comprising:
   a) a lever arm, said lever arm having a proximal end and a distal end, said proximal end being pivotally connected to a frame component of said fifth wheel so that said lever arm may arc a distance about said pivotally connected end, said lever arm further adjustably connected near said proximal end of said lever arm to components of a fifth wheel locking mechanism, said components including components selected from the group consisting of a wedge, a jaw, a hook, a clamp, and a timer mechanism; and
   b) a self-adjusting tolerance correcting ratchet system, said system comprising in combination a rack having a plurality of steps and a dog having a pawl, said dog and pawl being pivotally connected to said distal end of said lever arm, said rack being connected to a frame component of said fifth wheel, said dog and pawl further being urged towards engagement with said plurality of steps when said lever arm, dog and pawl travel across said rack towards a locked position of said fifth wheel locking mechanism, said dog and pawl being urged towards engagement with said plurality of steps by a resilient retention means connected between said dog and said lever arm.

2. A fifth wheel according to claim 1 wherein said resilient retention means is selected from the group consisting of a spring, a coil spring, a leaf spring, a spring plate, and a resilient band.

3. A fifth wheel according to claim 1 wherein said pawl is disengaged from said steps by a component of a retractable pull handle in active engagement upon said dog as said retractable pull handle is extracted from said fifth wheel.

4. A fifth wheel according to claim 1 wherein said pawl is disengaged from said steps by a component of a non-retractable pull handle in active engagement upon said dog as said non-retractable pull handle is extracted from said fifth wheel.

5. A fifth wheel according to claim 1 wherein said self-adjusting tolerance correcting ratchet system has the capability to maintain a maximum tolerance between a locking jaw and a king pin of one thirty-second inch.

6. A fifth wheel according to claim 1 wherein said self-adjusting tolerance correcting ratchet system has the capability to maintain a maximum tolerance between a locking jaw and a wedge of one quarter inch.

7. A fifth wheel according to claim 1 wherein said wedge and jaw are selected from the group consisting of a stepped-surface wedge, a stepped-surface jaw, a smooth-surface wedge and a smooth-surface jaw.

8. A fifth wheel according to claim 1 having an electronic sensor capable of distinguishing a position of said lever arm.

9. A fifth wheel according to claim 8 wherein said electronic sensor is an induction switch.

10. A fifth wheel according to claim 1 having an electronic sensor capable of distinguishing an engagement position of a trailer king pin plate with a fifth wheel plate.

11. A fifth wheel according to claim 10 wherein said electronic sensor is an induction switch.

12. A fifth wheel according to claim 1 further having a plurality of replaceable transverse strips imbedded or recessed in a top plate of said fifth wheel, an upper surface of said strips raised above said top plate between 1/16th and 1/8th inch, said strips further having qualities selected from the group consisting of low friction, low compressibility, high density, high impact resistance, a density of 0.97 g/cm$^3$, impact strength of 32.7 Ft lb/in, and a coefficient of friction of 0.08.

13. A fifth wheel comprising:
  a) a lever arm, said lever arm having a proximal end and a distal end, said proximal end being pivotally connected to a frame component of said fifth wheel so that said lever arm may arc a distance about said pivotally connected end, said lever arm further adjustably connected near said proximal end of said lever arm to components of a fifth wheel locking mechanism, said components including components selected from the group consisting of a wedge, a jaw, a hook, a clamp, and a timer mechanism;
  b) a self-adjusting tolerance correcting ratchet system, said system comprising in combination a rack having a plurality of steps and a dog having a pawl, said dog and pawl being pivotally connected to said distal end of said lever arm, said rack being connected to a frame component of said fifth wheel, said dog and pawl further being urged towards engagement with said plurality of steps when said lever arm, dog and pawl travel across said rack towards a locked position of said fifth wheel locking mechanism, said dog and pawl being urged towards engagement with said plurality of steps by a resilient retention means connected between said dog and said lever arm; and
  c) a retractable pull handle, said handle having a means to disengage said pawl from said steps which said means activates said disengagement as said handle is extracted from said fifth wheel, said retractable pull handle having the ability to retract into said fifth wheel whether said locking mechanism is in a closed or an open position.

14. A fifth wheel according to claim 13 wherein said resilient retention means is selected from the group consisting of a spring, a coil spring, a leaf spring, a spring plate, and a resilient band.

15. A fifth wheel according to claim 13 wherein said self-adjusting tolerance correcting ratchet system has the capability to maintain a maximum tolerance between a locking jaw and a king pin of one thirty-second inch.

16. A fifth wheel according to claim 13 wherein said self-adjusting tolerance correcting ratchet system has the capability to maintain a maximum tolerance between a locking jaw and a wedge of one quarter inch.

17. A fifth wheel according to claim 13 wherein said wedge and jaw are selected from the group consisting of a stepped-surface wedge, a stepped-surface jaw, a smooth-surface wedge and a smooth-surface jaw.

18. A fifth wheel according to claim 13 having an electronic sensor capable of distinguishing a position of said lever arm.

19. A fifth wheel according to claim 18 wherein said electronic sensor is an induction switch.

20. A fifth wheel according to claim 13 having an electronic sensor capable of distinguishing an engagement position of a trailer king pin plate with a fifth wheel plate.

21. A fifth wheel according to claim 20 wherein said electronic sensor is an induction switch.

22. A fifth wheel according to claim 13 further having a plurality of replaceable transverse strips imbedded or recessed in a top plate of said fifth wheel, an upper surface of said strips raised above said top plate between 1/16th and 1/8th inch, said strips further having qualities selected from the group consisting of low friction, low compressibility, high density, high impact resistance, a density of 0.97 g/cm$^3$, impact strength of 32.7 Ft lb/in, and a coefficient of friction of 0.08.

23. A fifth wheel comprising:
  a) a lever arm, said lever arm having a proximal end and a distal end, said proximal end being pivotally connected to a frame component of said fifth wheel so that said lever arm may arc a distance about said pivotally connected end, said lever arm further adjustably connected near said proximal end of said lever arm to components of a fifth wheel locking mechanism, said components including components selected from the group consisting of a wedge, a jaw, a hook, a clamp, and a timer mechanism;
  b) a self-adjusting tolerance correcting ratchet system, said system comprising in combination a rack having a plurality of steps and a dog having a pawl, said dog and pawl being pivotally connected to said distal end of said lever arm, said rack being connected to a frame component of said fifth wheel, said dog and pawl further being urged towards engagement with said plurality of steps when said lever arm, dog and pawl travel across said rack towards a locked position of said fifth wheel locking mechanism, said dog and pawl being urged towards engagement with said plurality of steps by a resilient retention means connected between said dog and said lever arm;
  c) a retractable pull handle, said handle having a means to disengage said pawl from said steps which said means activates said disengagement as said handle is extracted from said fifth wheel, said retractable pull handle having the ability to retract into said fifth wheel whether said locking mechanism is in a closed or an open position; and
  d) a plurality of replaceable transverse strips imbedded or recessed in a top plate of said fifth wheel, an upper surface of said strips raised above said top plate between 1/16th and 1/8th inch, said strips further having qualities selected from the group consisting of low friction, low compressibility, high density, high impact resistance, a density of 0.97 g/cm$^3$, impact strength of 32.7 Ft lb/in, and a coefficient of friction of 0.08.

24. A fifth wheel according to claim 23 wherein said resilient retention means is selected from the group consisting of a spring, a coil spring, a leaf spring, a spring plate, and a resilient band.

25. A fifth wheel according to claim 23 wherein said self-adjusting tolerance correcting ratchet system has the capability to maintain a maximum tolerance between a locking jaw and a king pin of one thirty-second inch.

26. A fifth wheel according to claim 23 wherein said self-adjusting tolerance correcting ratchet system has the capability to maintain a maximum tolerance between a locking jaw and a wedge of one quarter inch.

27. A fifth wheel according to claim 23 wherein said wedge and jaw are selected from the group consisting of a stepped-surface wedge, a stepped-surface jaw, a smooth-surface wedge and a smooth-surface jaw.

28. A fifth wheel according to claim 23 having an electronic sensor capable of distinguishing a position of said lever arm.

29. A fifth wheel according to claim 28 wherein said electronic sensor is an induction switch.

30. A fifth wheel according to claim 23 having an electronic sensor capable of distinguishing an engagement position of a trailer king pin plate with a fifth wheel plate.

31. A fifth wheel according to claim 30 wherein said electronic sensor is an induction switch.

* * * * *